(12) United States Patent
Daniel

(10) Patent No.: US 8,333,642 B2
(45) Date of Patent: Dec. 18, 2012

(54) SYSTEM AND METHOD FOR CONDUCTING A FANTASY SPORTS GAME

(75) Inventor: Isaac Sayo Daniel, Miami, FL (US)

(73) Assignee: F3M3 Companies, Inc., Miramar, FL (US)

( * ) Notice: Subject to any disclaimer, the term of this patent is extended or adjusted under 35 U.S.C. 154(b) by 314 days.

(21) Appl. No.: 12/613,717

(22) Filed: Nov. 6, 2009

(65) Prior Publication Data

US 2011/0111857 A1  May 12, 2011

(51) Int. Cl.
*A63F 9/24* (2006.01)
(52) U.S. Cl. .......................... 463/4; 463/2; 463/3; 463/5
(58) Field of Classification Search .................. 463/4, 2, 463/3, 5
See application file for complete search history.

(56) References Cited

U.S. PATENT DOCUMENTS

| | | | | |
|---|---|---|---|---|
| 6,371,855 | B1 * | 4/2002 | Gavriloff | 463/42 |
| 2004/0266535 | A1 * | 12/2004 | Reeves | 463/42 |
| 2005/0055232 | A1 * | 3/2005 | Yates | 705/1 |
| 2010/0279754 | A1 * | 11/2010 | Tanenbaum | 463/3 |
| 2012/0215639 | A1 * | 8/2012 | Ramer et al. | 705/14.53 |
| 2012/0215640 | A1 * | 8/2012 | Ramer et al. | 705/14.55 |

OTHER PUBLICATIONS

"Rules: Creating a Custom League," by ESPN.com, 2009, available at http://games.espn.go.com/ffl/content?page=fflrulescreatecustom2009.

* cited by examiner

*Primary Examiner* — Pierre E Elisca
(74) *Attorney, Agent, or Firm* — Alberto Interian, III, Esq.

(57) ABSTRACT

A system comprising a processor and computer executable instructions readable by the processor and operative to solicit at least one selection of at least one coach. A system comprising a communications module to solicit at least one selection of at least one coach, and a processor module to determine a coach's score based on at least one action of at least one member of a team. A method comprising using a processor to perform at least a portion of one or more of the following: soliciting at least one selection of at least one coach, monitoring at least one action of at least one member of a team, and determining a coach's score based on the at least one action.

23 Claims, 4 Drawing Sheets

SYSTEM AND METHOD FOR CONDUCTING A FANTASY SPORTS GAME

FIELD

The present disclosure relates generally to electronic systems, and more particularly, to systems, methods, and various other disclosures for conducting a fantasy sports game.

BACKGROUND

Fantasy sports games have been played since the mid-twentieth century, and it is estimated that over thirty million people played fantasy sports in 2008. Fantasy sports games are based on the concept of allowing a participant to act as a team owner by allowing them to select "fantasy" players to their team, and then manage the players and the team throughout the season. "Fantasy" players consist of real life professional athletes, so a participant can build a fantasy team of real life players from various real life teams.

Often times, participants compete against other participants who are in the same "fantasy league," with each participant's score being based on the real world performance of the players he or she has selected to their fantasy team. In fantasy sports games, participants can manage their players as if they were an actual team owner, such as by sitting a certain player out for the game, or trading a player away to another fantasy team.

There are several iterations on fantasy sports games, the most popular, however, are based on baseball, cricket, American football, football (soccer), basketball, golf, hockey, auto racing, and professional wrestling.

Traditionally, fantasy sports games scoring systems have been based on on-field player performance. For example, in fantasy football, which is based on American football, a certain amount of points are awarded to a participant if one of their fantasy players scores a touchdown, while points are deducted if one of their players commits a mistake, such as fumbling the ball.

Thus far, participants have only been allowed to select players from real life sports teams, which, which has limited the scope and entertainment value of fantasy sports games.

Also, thus far, fantasy players' performance has been based only on on-field activities, such as in-game performance, and not off-field activities, such as arrests, charitable involvement, and the like, which has also limited the scope and entertainment value of fantasy sports games.

SUMMARY

The systems and methods described herein result from the realization that fantasy sports games can be broadened in scope and made more entertaining by allowing participants to select at least one coach.

The systems and methods described herein also result from the realization that fantasy sports games can be further broadened in scope and made more entertaining by assigning a point value to team and/or player off-field activity.

Accordingly, the various embodiments and disclosures described herein solve the limitations of the prior art in a new and novel manner.

DETAILED DESCRIPTION OF PREFERRED EMBODIMENTS

System Level Overview

Figure 1:
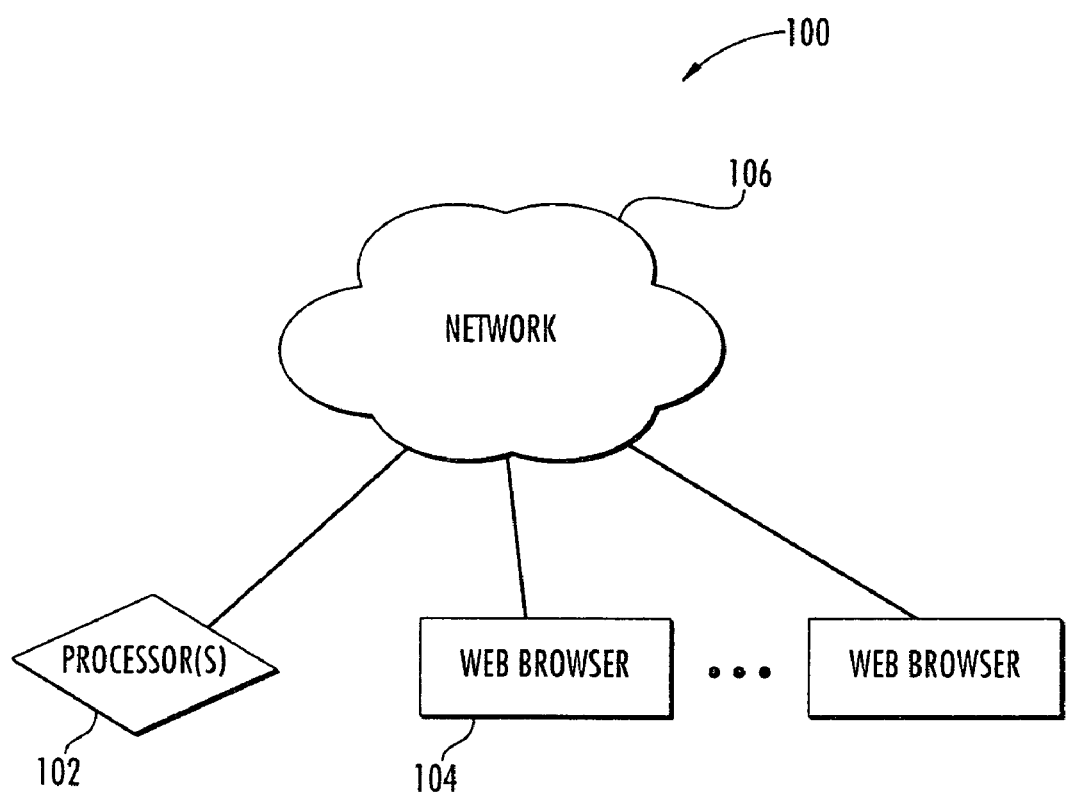
FIG. 1 shows a block diagram representing a system in accordance with one embodiment.

FIG. 1 shows a block diagram representing a system 100 in accordance with one embodiment. System 100 comprises a processor 102 and computer executable instructions (not shown) readable by the processor and operative to solicit at least one selection of at least one coach. In one embodiment, system 100 may be a fantasy sports game system, such as, but not limited to, fantasy American football, fantasy baseball, fantasy cricket, fantasy basketball, fantasy auto racing, fantasy rugby, fantasy soccer football (soccer), fantasy golf, fantasy tennis, fantasy hockey, and the like.

Processor 102 may be any type of processor, such as a central processing unit (CPU), a microprocessor, a front end processor, a coprocessor, a single-core processor, a multi-core processor, and the like.

The computer executable instructions may be any type of computer executable instructions, which may be in the form of a computer program, the program being composed in any suitable programming language or source code, such as C++, C, JAVA, JavaScript, HTML, XML, and other programming languages.

Soliciting at least one selection of at least one coach may include soliciting at least one selection of at least one coach during a draft period, which may be before the start of a season of a particular sport. In some embodiments, the coach may be any coach, such as, but not limited to, a head coach, a defensive coach, an offensive coach, and any other coach and/or manager.

The term "coach" as used throughout this disclosure, may refer to a real-life coach, such as, but not limited to, a head coach, a defensive coach, an offensive coach, or any other coach and/or manager. Such a coach may be the subject of a fantasy sports game.

In one embodiment, the computer executable instructions are operative to monitor at least one action of at least one member of a team. In another embodiment, the computer executable instructions are operative to monitor at least one on-field action of a member, or at least one off-field action of a member, or both. In yet another embodiment, the computer executable instructions are operative to monitor at least one action of a team as a whole. In yet another embodiment, the computer executable instructions are operative to monitor at least one action of a player on a team. In another embodiment, the computer executable instructions are operative to monitor at least one action of at least one coach on a team.

The term "member of a team" as used throughout this disclosure, may refer to any member of a sports team, such as, but not limited to, a player, a coach, an owner, a staff member, such as a trainer or doctor, or any other member of a sports team. The term "player" as used throughout this disclosure, may refer to a real-life athlete. Such an athlete may be the subject of a fantasy sports game.

In yet another embodiment, the computer executable instructions are operative to monitor at least one action of at least one player under the coach's supervision. For example, when a quarterbacks coach is selected, the computer executable instructions may be operative to monitor the actions of the quarterback. In another embodiment, the computer executable instructions are operative to monitor at least one unit of players under the coach's supervision. For example, when a defensive coordinator is selected, the computer executable instructions may be operative to monitor the actions of the defense. In some embodiments, the actions and/or point values may be translated into or from on-field statistics, such as certain plays or performances in a game, such as, but not limited to, a strike out, a tackle, a forced fumble, a fumble, an interception, a touchdown, yards gained, points scored, goals scored, field goals made, field goals missed, and the like. In other embodiments, the actions and/or point values may be translated into or from off-field statistics, such as, but not limited to, nm-ins with the law, charitable activities, winning an award, making the pro-bowl or all-star game, poor television interviews, and the like.

In another embodiment, the computer executable instructions are operative to determine a coach's score based on the at least one action of at least one member of a team. In some embodiments, the computer executable instructions are operative to determine a coach's score based on the at least one action of at least one member of a team by assigning at least one point value to the at least one action, calculating at least one total point value, and basing a coach's score on the at least one total point value. In some embodiments, assigning at least one point value to the at least one action includes assigning at least one positive point value to at least one action. In other embodiments, assigning at least one point value to at least one action includes assigning at least one negative point value to at least one action. In another embodiment, assigning at least one point value to at least one action includes assigning at least one point value to at least one on-field action. In yet another embodiment, assigning at least one point value to at least one action includes assigning at least one point value to at least one off-field action.

In some embodiments, the actions and/or point values may be translated into or from on-field statistics, such as certain plays or performances in a game, such as, but not limited to, a strike out, a tackle, a forced fumble, a fumble, an interception, a touchdown, yards gained, points scored, goals scored, field goals made, field goals missed, and the like. In other embodiments, the actions may and/or point values be translated into or from off-field statistics, such as, but not limited to, run-ins with the law, charitable activities, winning an award, making the pro-bowl or all-star game, poor television interviews, and the like.

In some embodiments, the actions on which the coach's score is based may be the actions of the individual player or unit under the coach's supervision. For example, when a quarterbacks coach is selected, the computer executable instructions may base the coach's score on the actions of the quarterback, or when a defensive coordinator is selected, the computer executable instructions may base the coach's score on the actions of the defense.

In another embodiment, the computer executable instructions are operative to solicit at least one selection of at least one coach through at least one network 106. Network 106 may be any type of computer network, such as a world-wide-web, a local area network (LAN), a wide area network (WAN), and integrated services digital network (ISDN), a dial-up network, and the like. The term "world-wide-web" may refer to any world-wide-web, which may include a set of interlinked hypertext documents accessed via a network of interconnected computers, such as the internet.

In another embodiment, the computer executable instructions are operative to solicit at least one selection of at least one coach through at least one web browser 104. Web browser 104 may be any type of web browser, such as MICROSOFT INTERNET EXPLORER®, NETSCAPE NAVIGATOR®, OPERA®, MOSAIC®, SAFARI®, CHROME®, and any other web browser capable of accessing a computer network, such as the world-wide-web or the internet.

Figure 2A:
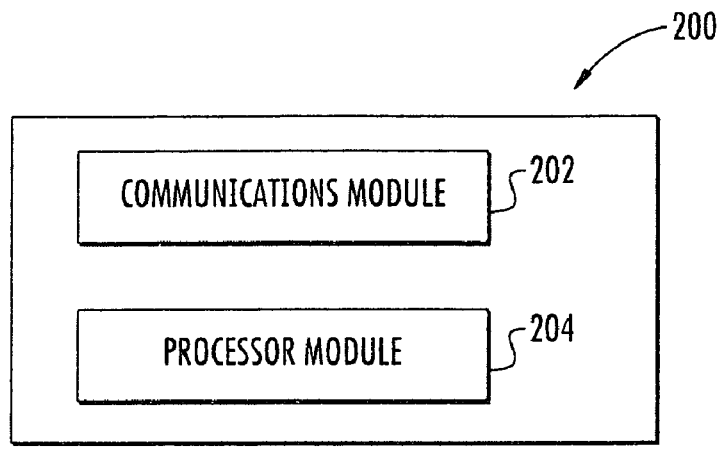
FIG. 2A shows a block diagram representing a system in accordance with another embodiment.

Referring now to FIG. 2A, a system 200 is shown in accordance with one embodiment. System 200 comprises of a communications module 202 to solicit at least one selection of at least one coach of at least one team, and a processor module 204 to determine a coach's score based on at least one action of at least one member of a team. In some embodiments, system 200 may be a fantasy sports game system, such as, but not limited to, fantasy American football, fantasy baseball, fantasy cricket, fantasy basketball, fantasy auto racing, fantasy rugby, fantasy soccer football (soccer), fantasy golf, fantasy tennis, fantasy hockey, and the like.

The term "module," as used throughout this disclosure, may refer to a unit of distinct functionality that may be presented in software, hardware, or combinations thereof. When the functionality of a module is performed in any part through software, the module includes a machine readable medium.

In one embodiment, in addition to soliciting at least one selection of at least one coach of at least one team, communications module 202 may receive and/or transmit game information, such as, but not limited to, coaches' scores, players' scores, sports statistics, fantasy sports game statistics, user scores, news, user information, such as user names and passwords, user settings, game settings, game scores, game forecasting, sports forecasting, game trend data, past game information, future game information, and other game information referred to and/or used while conducting, participating in, or hosting a game, such as, but not limited to, a fantasy sports game.

The term "user," as used throughout this disclosure, may refer to the user of a system or method, such as a fantasy sports game system or method. A user may also be a participant in a fantasy sports game. A user may also be a moderator or administrator of a fantasy sports game.

In one embodiment, communications module 202 may comprise a software aspect, such as a computer program used to communicate. In another embodiment, communications module 202 may comprise a hardware aspect, such as communications hardware. Such communications hardware may include, but is not limited to, a network adapter and/or card, a modem, and the like. In yet another embodiment, communications module 206 may comprise both hardware and software aspects, such as those described directly above and elsewhere throughout the present disclosure.

In another embodiment, processor module 204 may use any of the methods to determine a coach's score based on at least one action of at least one member of a team described herein, such as, but not limited to, assigning at least one point value to at least one action of a member of a team, calculating at least one total point value, and basing a coach's score on the at least one total point value. In some embodiments, assigning at least one point value to the at least one action includes assigning at least one positive point value to at least one action. In other embodiments, assigning at least one point value to at least one action includes assigning at least one negative point value to at least one action. In another embodiment, assigning at least one point value to at least one action includes assigning at least one point value to at least one on-field action. In yet another embodiment, assigning at least one point value to at least one action includes assigning at least one point value to at least one off-field action.

In some embodiments, the actions and/or point values may be translated into or from on-field statistics, such as certain plays or performances in a game, such as, but not limited to, a strike out, a tackle, a forced fumble, a fumble, an interception, a touchdown, yards gained, points scored, goals scored, field goals made, field goals missed, and the like. In other embodiments, the actions and/or point values may be translated into or from off-field statistics, such as, but not limited to, run-ins with the law, charitable activities, winning an award, making the pro-bowl or all-star game, television interviews, and the like.

In some embodiments, the actions on which the coach's score is based may be the actions of the individual player or unit under the coach's supervision. For example, when a quarterbacks coach is selected, the coach's score may be based on the actions of the quarterback, or when a defensive coordinator is selected, the coach's score may be based on the actions of the defense.

In one embodiment, processor module 204 may comprise a hardware aspect such as a computer processor, including, but not limited to, any of those previously described with reference to the embodiments described throughout the present disclosure. In another embodiment, processor module 204 may comprise a software aspect, such as, but not limited to, a computer program, such as an operating system, sports statistics software, game management software, such as fantasy sports game management software, and the like. In yet another embodiment, processor module 204 may comprise both hardware and software aspects, such as those described directly above and elsewhere throughout the present disclosure.

Figure 2B:
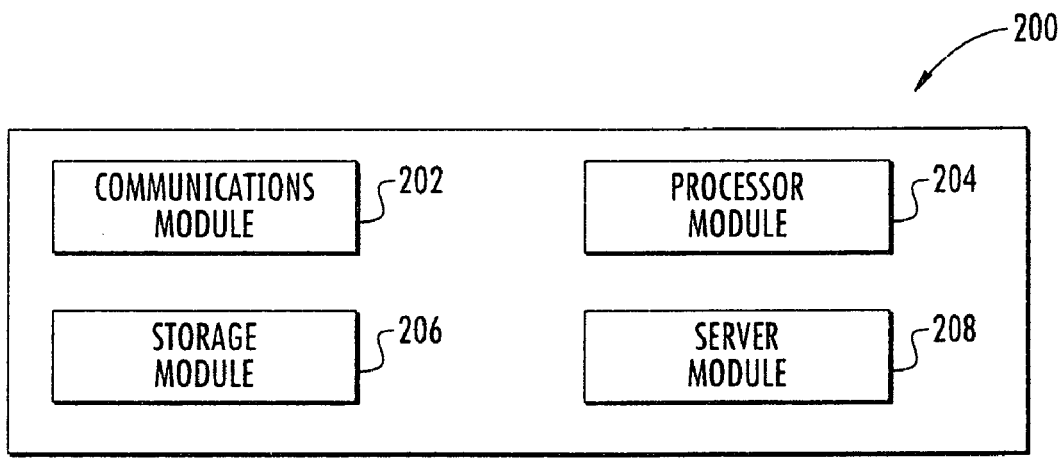
FIG. 2B shows a block diagram representing a system in accordance with yet another embodiment.

FIG. 2B shows system 200 in accordance with another embodiment. System 200 further comprises a storage module 206 to store game information. In various embodiments of system 200, such game information may include, but is not limited to, coaches' scores, players' scores, sports statistics, fantasy sports game statistics, user scores, news, user information, such as user names and passwords, user settings, game settings, game scores, game forecasting, sports forecasting, game trend data, past game information, future game information, and other game information referred to and/or used while conducting, participating in, or hosting a game, such as, but not limited to, a fantasy sports game.

In one embodiment, storage module 206 may possess a hardware aspect, such as storage hardware. Such storage hardware may include, but is not limited to, read-only memory, such as CD-ROMs, DVDs, floppy disks, and the like, read and write memory, such as a hard drive, floppy disc, CD-RW, DVD-RW, solid state memory, such as solid state hard drives, flash disks, and the like, and random access memory. In another embodiment, storage module 206 may possess a software aspect, such as, but not limited to, database building software, file management software, and the like. In yet another embodiment, storage module 206 may comprise both hardware and software aspects, such as those described directly above and elsewhere throughout the present disclosure.

In another embodiment of system 200, system 200 further comprises a server module 208 to host a game, such as, but not limited to, a fantasy sports game. In some embodiments of system 200, server module 208 may host a game on a closed computer network, such as, but not limited to, a local area network (LAN), a wide area network (WAN), an integrated services digital network, a dial-up network, or other forms of a closed computer network. In an alternate embodiment of system 200, server module 208 may host a game on an open computer network, such as, but not limited to, a world-wide-web, or other forms of an open computer network. In one embodiment, server module 208 may comprise a hardware aspect, such as, but not limited to, a server computer. In another embodiment, server module 208 may comprise a software aspect, such as hosting computer software, including, but not limited to, a server operating system. In yet another embodiment, server module 208 may comprise both hardware and software aspects, such as those described directly above and elsewhere throughout the present disclosure.

In yet a further embodiment of system 200, system 200 further comprises an authentication module (not shown) to authenticate a client, such as a system user, such as, but not limited to, a game user, and/or an administrator, such as, but not limited to, a game moderator. In one embodiment, the authentication module may comprise a software aspect, such as, but not limited to, authentication software, and the like. In another embodiment, the authentication module may comprise a hardware aspect, such as, but not limited to, authentication hardware, and the like. In yet another embodiment, the authentication module may comprise both hardware and software aspects, such as those described directly above and elsewhere throughout the present disclosure.

In yet another embodiment of system 200, system 200 further comprises a display module (not shown) to display information, such as, but not limited to, game information, such as, but not limited to fantasy sports game information such as has been described elsewhere throughout the present disclosure. In a further embodiment, the display module is operative to display information on a web browser. In one embodiment, the display module may comprise a software aspect, such as display software, including, but not limited to, video software, video drivers, graphic display software, or other software suitable to display information. In another embodiment, the display module may comprise a hardware aspect, such as display hardware, including, but not limited to, a video graphics card, a computer monitor, a projector, a television, other forms of viewing screens, or other hardware suitable to display computer information. In yet another embodiment, the display module may comprise both hardware and software aspects, such as those described directly above and elsewhere throughout the present disclosure.

Figure 3:
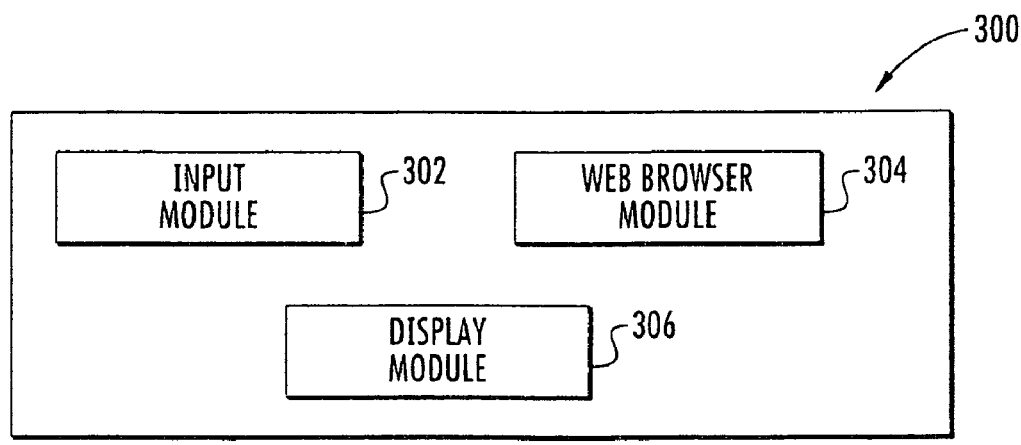
FIG. 3 shows a block diagram representing a system in accordance with one embodiment.

FIG. 3 shows a block diagram representing a system 300 in accordance with yet another embodiment. In one embodiment, system 300 comprises an input module 302 to receive user input, a web browser module 304 to transmit and/or receive information, and a display module 306 to display information, such as a game information, including, but not limited to, fantasy sports game information. System 300 may be a game system, such as, but not limited to, a fantasy sports game system.

In one embodiment of system 300, web browser module 304 is operative to transmit and/or receive game information, such as fantasy sports game information. In another embodiment, web browser module 304 is operative to access game information. In yet another embodiment, web browser module 304 is operative to transmit input information, such as, but not limited to, coaches' scores, players' scores, sports statistics, fantasy sports game statistics, user scores, news, user information, such as user names and passwords, user settings, game settings, game scores, game forecasting, sports forecasting, game trend data, past game information, future game information, and other game information referred to and/or used while conducting, participating in, or hosting a game, such as, but not limited to, a fantasy sports game, as well as any other game information described throughout the present disclosure. In one embodiment, web browser module 304 may comprise a software aspect, such as a computer program, including, but not limited to, MICROSOFT INTERNET EXPLORER®, NETSCAPE NAVIGATOR®, OPERA®, MOSAIC®, SAFARI®, CHROME®, or any other form of computer software or program capable of browsing a computer network, such as the world-wide-web. In another embodiment, web browser module 304 may comprise a hardware aspect, such as a personal computer, including but not limited to, a web pc, a laptop, an internet station, a personal digital assistant, a smart phone, and the like. In yet another embodiment, web browser module 304 may comprise both hardware and software aspects, such as those described directly above and elsewhere throughout the present disclosure.

In another embodiment of system 300, display module 306 is operative to display game information, such as, but not limited to, game information, which may include coaches' scores, players' scores, sports statistics, fantasy sports game statistics, user scores, news, user information, such as user names and passwords, user settings, game settings, game scores, game forecasting, sports forecasting, game trend data, past game information, future game information, and other game information referred to and/or used while conducting, participating in, or hosting a game, such as, but not limited to, a fantasy sports game, as well as any other game information described throughout the present disclosure. In a further embodiment of system 300, display module 306 is operative to display game information on a web browser. In one embodiment, display module 306 may comprise a software aspect, such as, but not limited to, video software, video drivers, graphic display software, or other software suitable to display information. In another embodiment, display module 306 may comprise a hardware aspect, such as display hardware, including, but not limited to, a video graphics card, a computer monitor, a projector, a television, other forms of viewing screens, or other hardware suitable to display information. In yet another embodiment, display module 306 may comprise both hardware and software aspects, such as those described directly above and elsewhere throughout the present disclosure.

In one embodiment, system 300 further comprises a network module (not shown) to access a computer network. In one embodiment, the network module is operative to access a closed computer network, such as a local area network, a dial-up network, or another form of closed computer network. In another embodiment, the network module is operative to access an open computer network, such as a world-wide-web, or other form of open computer network. In one embodiment, the network module may comprise a software aspect, such as network software, including, but not limited to, networking software such as those produced by CISCO SYSTEMS®, SUN MICROSYSTEMS®, and ORACLE®. In another embodiment, the network module may comprise a hardware aspect, such as network hardware, including, but not limited to, a network adapter, a wireless network adapter, a modem, and other hardware capable of accessing and/or communicating through a network. In yet another embodiment, the network module may comprise both hardware and software modules, such as those described directly above and elsewhere throughout the present disclosure.

Methods

In this section, particular methods of example embodiments are described by reference to a series of flow charts. In some embodiments, the methods to be performed constitute computer programs made of computer executable instructions. In other embodiments, the methods described herein may be implemented as a computer readable medium having computer executable instructions. The term "compute readable medium," as used throughout this disclosure, ay refer to any computer readable medium, such as CD-ROMs, CD-Rs, CD-RWs, DVDs, DVD-RWs, DVD-Rs, floppy disks, hard drives, flash drives, diskettes, solid state drives, tape drives, and any other form of computer readable medium.

Figure 4:
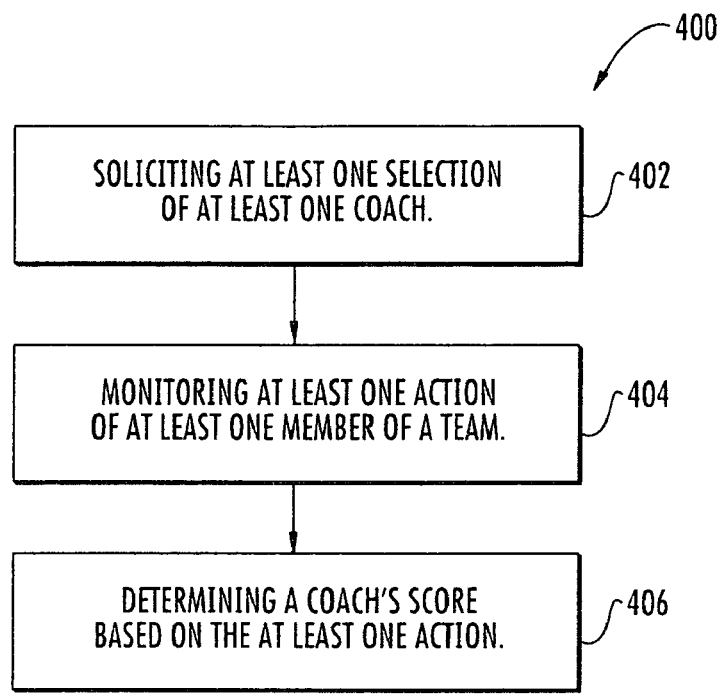
FIG. 4 shows a flow chart illustrating a method in accordance with one embodiment.

Referring now to FIG. 4, a flow chart illustrating a method 400 is shown in accordance with one embodiment. Method 400 comprises using a processor to perform at least a portion of one or more of the following: soliciting at least one selection of at least one coach (block 402), monitoring at least one action of at least one member of a team (block 404), and determining a coach's score based on the action (block 406). In some embodiments, method 400 may be a method for conducting a game, such as a fantasy sports game. In various embodiments, the processor may be any of the processors described above with reference to FIGS. 1 through 3.

In some embodiments, soliciting at least one selection of at least one coach 402 may include soliciting at least one selection of at least one coach during a draft period, which may be before the start of a season of a particular sport. In some embodiments, the coach may be any coach, such as, but not limited to, a head coach, a defensive coach, an offensive coach, and any other coach and/or manager.

In one embodiment, the computer executable instructions are operative to monitor at least one action of at least one member of a team. In one embodiment, the computer executable instructions are operative to monitor at least one on-field action of a member, or at least one off-field action of a member, or both. In yet another embodiment, the computer executable instructions are operative to monitor at least one action of a team as a whole. In another embodiment, the computer executable instructions are operative to monitor at least one action of a player on a team. In another embodiment, the computer executable instructions are operative to monitor at least one action of at least one coach on a team.

The term "member of a team" as used throughout this disclosure, may refer to any member of a sports team, such as, but not limited to, a player, a coach, an owner, a staff member, such as a trainer or doctor, or any other member of a sports team. The term "player" as used throughout this disclosure, may refer to a real-life athlete. Such an athlete may be the subject of a fantasy sports game.

In some embodiments, monitoring at least one action of at least one member of a team (step 404) may include monitoring at least one action of at least one player of a team. In other embodiments, step 404 may include monitoring at least one action of a team as a whole. In yet another embodiment, step 404 may include monitoring at least one action of at least one player under the coach's supervision. For example, when a quarterbacks coach is selected, step 404 may include monitoring the actions of the quarterback. In another embodiment, step 404 may include monitoring at least one action at least one unit of players under the coach's supervision. For example, when a defensive coordinator is selected, step 404 may include monitoring the actions of the defense. In some embodiments, the actions and/or point values may be translated into or from on-field statistics, such as certain plays or performances in a game, such as, but not limited to, a strike out, a tackle, a forced fumble, a fumble, an interception, a touchdown, yards gained, points scored, goals scored, field goals made, field goals missed, and the like. In other embodiments, the actions and/or point values may be translated into or from off-field statistics, such as, but not limited to, run-ins with the law, charitable activities, winning an award, making the pro-bowl or all-star game, poor television interviews, and the like.

Figure 5:
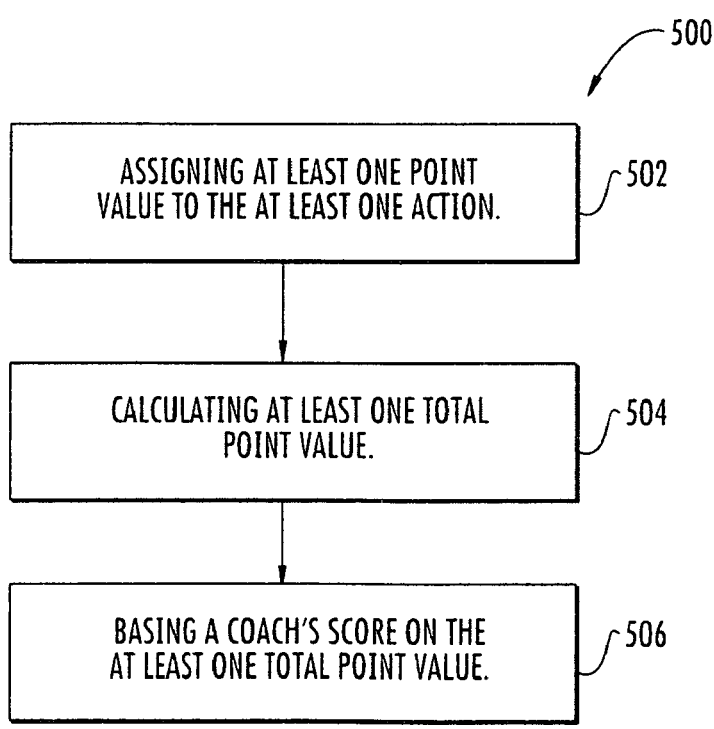
FIG. 5 shows a flow chart illustrating a method in accordance with another embodiment.

Referring now to FIG. 5, determining a coach's score based on the at least one action 500 (also step 406) may include assigning at least one point value to the at least one action 502, calculating at least one total point value 504, and basing a coach's score on the at least one total point value 506. In some embodiments, assigning at least one point value to the at least one action 502 includes assigning at least one positive point value to at least one action. In other embodiments, assigning at least one point value to at least one action 502 includes assigning at least one negative point value to at least one action. In another embodiment, assigning at least one point value to at least one action 502 includes assigning at least one point value to at least one on-field action. In yet another embodiment, assigning at least one point value to at least one action 502 includes assigning at least one point value to at least one off-field action.

In some embodiments, the actions and/or point values may be translated into or from on-field statistics, such as certain plays or performances in a game, such as, but not limited to, a strike out, a tackle, a forced fumble, a fumble, an interception, a touchdown, yards gained, points scored, goals scored, field goals made, field goals missed, and the like. In other embodiments, the actions and/or point values may be translated into or from off-field statistics, such as, but not limited to, run-ins with the law, charitable activities, winning an award, making the pro-bowl or all-star game, poor television interviews, and the like.

In some embodiments, the actions on which the coach's score is based may be the actions of the individual player or unit under the coach's supervision. For example, when a quarterbacks coach is selected, the coach's score may be based on the actions of the quarterback, or when a defensive coordinator is selected, the coach's score may be based on the actions of the defense.

Referring back to FIG. 4, in some embodiments, method 400 may comprise determining a highest score of at least one user. The user may be a user of a fantasy sports game system and/or method. The user may also be a participant in a game, such as a fantasy sports game. Determining a highest score of a user may include determining a highest score by aggregating the scores of all the members of the user's fantasy sports team, such as, but not limited to, the coaches, the players, and other members of the team. Method 400 may also include announcing a winner of a fantasy sports contest by announcing the user who has the highest score at the end of the fantasy sports game season, and/or real life season.

In some embodiments, method 400 further comprises transmitting game information. Transmitting game information may include transmitting game information from a user of a game system and/or method to another user of the game system and/or method. In other embodiments, transmitting game information may include transmitting game information between a user of a system and/or method and an administrator/moderator of a system and/or method.

In some embodiments, transmitting game information may include transmitting game information through a computer network. The network may be any type of computer network, such as a world-wide-web, a local area network (LAN), a wide area network (WAN), and integrated services digital network (ISDN), a dial-up network, and the like.

The game information may include coaches' scores, players' scores, sports statistics, fantasy sports game statistics, user scores, news, user information, such as user names and passwords, user settings, game settings, game scores, game forecasting, sports forecasting, game trend data, past game information, future game information, and other game information referred to and/or used while conducting, participating in, or hosting a game, such as, but not limited to, a fantasy sports game, as well as any other game information described throughout the present disclosure.

In some embodiments, the method 400 is implemented as a computer readable medium having computer executable instructions.

Hardware and Operating Environment

This section provides an overview of example hardware and the operating environments in conjunction with which embodiments of the inventive subject matter can be implemented.

A software program may be launched from a computer readable medium in a computer-based system to execute function defined in the software program. Various programming languages may be employed to create software programs designed to implement and perform the methods disclosed herein. The programs may be structured in an object-orientated format using an object-oriented language such as Java or C++. Alternatively the programs may be structured in a procedure-oriented format using a procedural language, such as assembly or C. The software components may communicate using a number of mechanisms, such as application program interfaces, or inter-process communication techniques, including remote procedure calls. The teachings of various embodiments are not limited to any particular programming language or environment. Thus, other embodiments may be realized, as discussed regarding FIG. 6 below.

Figure 6:
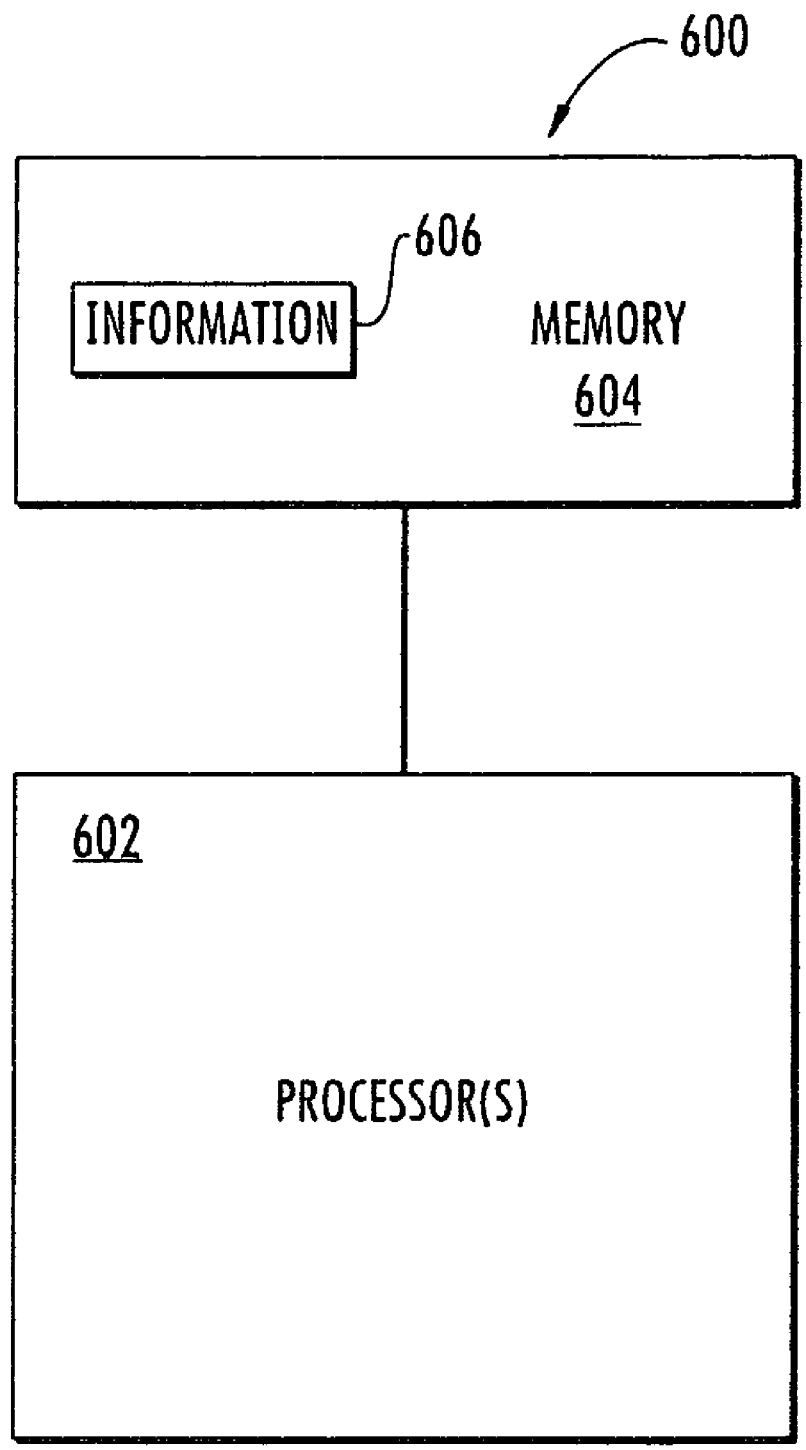
FIG. 6 shows a block diagram representing an article according to various embodiments.

FIG. 6 is a block diagram representing an article according to various embodiments. Such embodiments may comprise a computer, a memory system, a magnetic or optical disk, some other storage device, or any type of electronic device or system. The article 600 may include one or more processor(s) 602 couple to a machine-accessible medium such as a memory 604 (e.g., a memory including electrical, optical, or electromagnetic elements). The medium may contain associated information 606 (e.g., computer program instructions, data, or both) which, when accessed, results in a machine (e.g., the processor(s) 602) performing the activities previously described herein.

The principles of the present disclosure may be applied to all types of computers, systems, and the like, include desktop computers, servers, notebook computers, personal digital assistants, and the like. However, the present disclosure may not be limited to the personal computer.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed is:

1. A system comprising:
a processor; and
computer executable instructions readable by the processor and operative to:
solicit at least one selection to fill at least one coach position on at least one fantasy team, wherein the at least one selection comprises at least one selection of at least one coach of at least one sports team to fill the position on the fantasy team;

monitor at least one on-field or off-field action or statistic of at least one sports team or at least one member of at least one sports team; and determine a coach's score based on the at least one on-field or off-field action of the at least one member or the at least one sports team.

2. The system of claim 1, wherein the at least one member of at least one team comprises at least one member under the supervision of the at least one coach.

3. The system of claim 1, wherein the at least one sports team comprises at least one sports team under the supervision of the at least one coach.

4. The system of claim 1, wherein the computer executable instructions are operative to solicit the at least one selection through at least one computer network.

5. The system of claim 4, wherein the at least one computer network comprises a world-wide-web.

6. A system comprising:

a communications module to receive at least one selection to fill at least one coach position on at least one fantasy team, wherein the at least one selection comprises at least one selection of at least one coach of at least one sports team to fill the position on the fantasy sports team; and a processor module to:

determine at least one coach's score based on at least one on-field or off-field action or statistic of at least one sports team or at least one member of a sports team, wherein determining at least one coach's score based on at least one on-field or off-field action or statistic of at least one sports team or at least one member of at least one sports team, comprises assigning at least one positive or negative point value to the at least one on-field or off-field action or statistic of the at least one sports team or at least one member of at least one sports team.

7. The system of claim 6, wherein the communications module is operative to transmit game information.

8. The system of claim 6, wherein the game information comprises at least one coach's score.

9. The system of claim 6, wherein the game information comprises at least one user's score.

10. The system of claim 6, further comprising a storage module to store game information.

11. The system of claim 6, further comprising a server module to host a game.

12. A method comprising:

using at least one processor to perform at least a portion of one or more of the following:

soliciting at least one selection to fill at least one coach position on at least one fantasy team, wherein the at least one selection comprises at least one selection of at least one coach of at least one sports team to fill the position on the at least one fantasy team;

monitoring at least one on-field or off-field action or statistic of at least one sports team or at least one member of at least one sports team; and determining a coach's score based on the at least one on-field or off-field action or statistic of the at least one sports team or the at least one member of a sports team.

13. The method of claim 12, wherein monitoring at least one on-field or off-field action or statistic of at least one member of at least one sports team comprises monitoring at least one on-field or off-field action or statistic of at least one player of at least one sports team.

14. The method of claim 12, wherein monitoring at least one on-field or off-field action or statistic of at least one sports team or at least one member of a sports team includes monitoring at least one on-field or off-field action or statistic of at least one sports team or at least one member of at least one sports team, wherein at least one of the at least one sports team or the at least one member of at least one sports team is under the supervision of the at least one coach.

15. The method of claim 12, wherein soliciting at least one selection to fill at least one coach position on at least one fantasy team comprises soliciting at least one selection to fill at least one coach position on at least one fantasy team during a draft period.

16. The method of claim 12, wherein determining a coach's score based on the at least one on-field or off-field action or statistic of at least one sports team or at least one member of at least one sports team comprises:

assigning at least one point value to the at least one on-field or off-field action or statistic;

calculating at least one total point value; and basing a coach's score on the at least one total point value.

17. The method of claim 16, wherein assigning at least one point value to at least one on-field or off-field action or statistic includes assigning at least one positive point value to at least one on-field or off-field action or statistic.

18. The method of claim 16, wherein assigning at least one point value to at least one on-field or off-field action or statistic includes assigning at least one negative point value to at least one on-field or off-field action or statistic.

19. The method of claim 12, wherein monitoring at least one on-field or off-field action or statistic of at least one sports team or at least one member of at least one sports team comprises monitoring at least one on-field or off-field action or statistic of at least one unit of players on a sports team.

20. The method of claim 12, wherein monitoring at least one on-field or off-field action or statistic of at least one sports team or at least one member of at least one sports team comprises monitoring at least one in-game play or performance, or at least one off-field public action or statistic of at least one sports team or at least one member of at least one sports team.

21. The method of claim 12, further comprising determining a highest score of at least one user, wherein the highest score of the at least one user is based, in whole or in part, on the coach's score.

22. The method of claim 12, further comprising transmitting game information.

23. The method of claim 22, wherein transmitting game information includes transmitting game information through at least one computer network.

* * * * *